Aug. 22, 1950     L. A. MINTON     2,519,392
EGG SEPARATOR HAVING A PIVOTED YOLK RETAINER
Filed Nov. 13, 1945     2 Sheets-Sheet 1
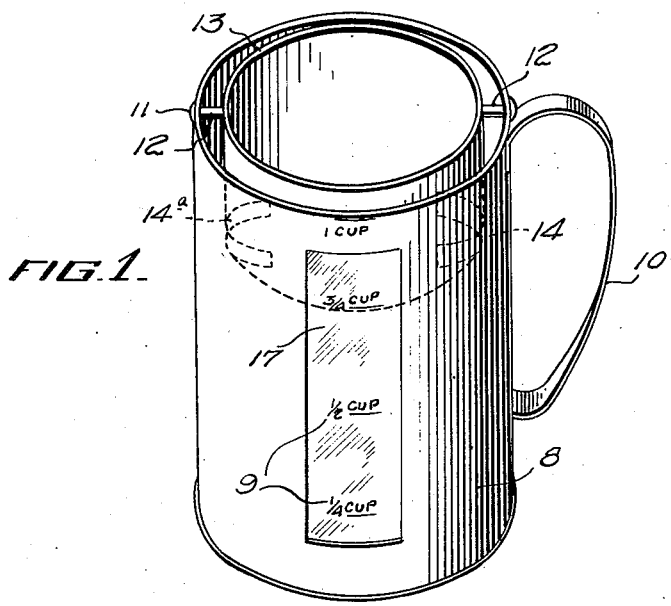
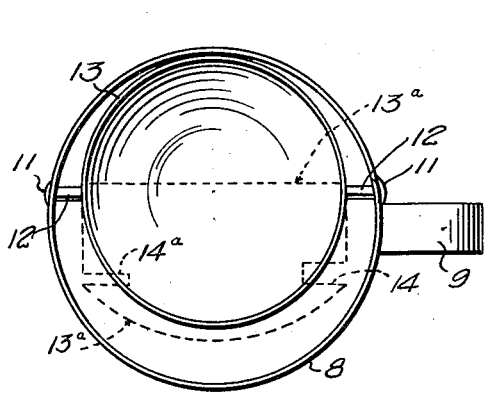
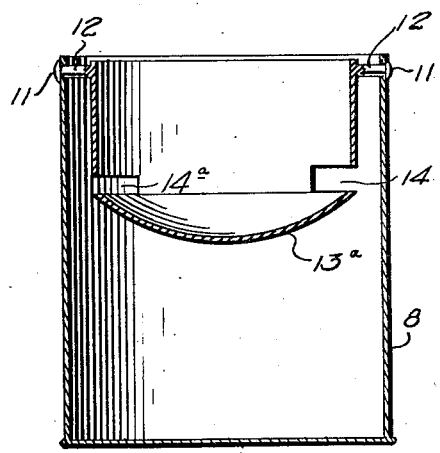
Inventor
LESLIE A. MINTON Aug. 22, 1950     L. A. MINTON     2,519,392
EGG SEPARATOR HAVING A PIVOTED YOLK RETAINER Filed Nov. 13, 1945     2 Sheets-Sheet 2

Inventor
LESLIE A. MINTON
By Eugene   Attorney

Patented Aug. 22, 1950

2,519,392

UNITED STATES PATENT OFFICE 2,519,392

EGG SEPARATOR HAVING A PIVOTED YOLK RETAINER

Leslie A. Minton, Portland, Oreg.

Application November 13, 1945, Serial No. 628,235

5 Claims. (Cl. 146—2)

My invention relates to improvements in egg separators which are employed for separating the yolks and albumen so that the same can be collected in different vessels for separate use.

One of the primary objects of the invention is to provide an egg receiving yolk retainer which is pivoted for vertical movement to a cup or other support so that when the subjacent albumen receiving vessel is tilted the yolk retainer will remain substantially horizontal.

The invention also contemplates a yolk retainer, so mounted with respect to a support, that it will tilt with the support when the latter is moved in one direction but will remain substantially horizontal when the support is moved in the opposite direction, thus providing not only for initial pouring out of the albumen from a subjacent vessel but also for subsequent pouring of the yolk from the yolk retainer.

Another object of the invention is to furnish an egg separator having a yolk retainer removably pivoted for vertical swing movement in the mouth of an albumen receiving cup, the latter being available for other purposes, such as for instance, a measuring cup, when the yolk retainer is removed.

Still another object of the invention resides in the provision of an egg separator having a yolk retaining cup provided with albumen outlet openings of different sizes so that a thick concentration of albumen may be readily discharged.

The invention also has for an object, to provide a device as characterized which may be made of many different materials such as plastic or metal, the nature of the construction being such that it is inexpensive to manufacture. One phase of the invention contemplates visual display of the contents of the device.

Various other objects and advantages of the invention will be apparent as the description proceeds, reference being had to the accompanying drawings which illustrate two presently preferred forms of the invention.

In the drawings, wherein the same reference characters have been used to designate the same parts throughout the several views—

Fig. 1 is a perspective view of an egg separator embodying my invention, the same being formed of metal;

Fig. 2 is a top plan view thereof, the dotted lines indicating the position of the yolk retainer when the albumen cup has been tilted to discharge its contents;

Fig. 3 is a central vertical sectional view through the assembly of Figs. 1 and 2;

Figure 5:
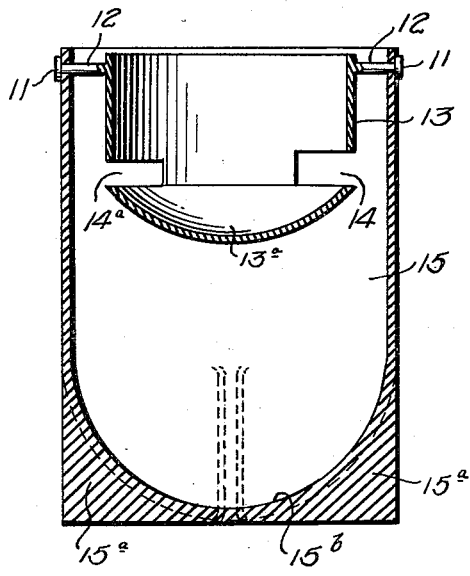
Fig. 5 is a central vertical sectional view through the unit shown in Fig. 4.

Referring to the drawings by reference characters, and turning to Figs. 1-3, inclusive, numeral 8 designates what may be an ordinary cup having a vertical series of transverse graduations 9, such as are used in connection with measuring cups. A handle 10 is also provided.

In carrying out the invention, I provide the cup 8 with bearing-provided indentations at opposite sides adjacent its mouth. These indentations 11 are disposed at one side of the transverse mid-portion of the cup 8 and are adapted to receive the laterally projecting pintles 12 carried by opposite sides of the egg receiving and yolk retaining bowl 13, as best shown in Fig. 2.

The yolk retaining bowl 13 has a dished or interiorly concaved bottom 13a, and the side walls immediately above the sides of the bottom 13a are provided with albumen outlets 14 and 14a. The albumen outlet 14 is preferably larger than the companion outlet 14a so as to admit of ready discharge of thick masses of albumen.

It is to be noted that the albumen outlet openings 14, 14a are disposed at the sides of the yolk retaining bowl in the region below the pintles 12. By this arrangement, the cup 8 can be tilted slightly in plane with the pintles 12 without causing movement of the yolk retainer 13.

As shown in Fig. 2, the egg receiving yolk retainer 13 is diametrically smaller than the cup 8 and a side wall portion of the yolk retainer is disposed in close proximity to a wall portion of the cup so that the latter will act as a stop to cause the yolk retainer 13 to tilt with the cup when the latter is tilted backwardly as viewed in Fig. 1. This arrangement, however, permits the yolk retainer 13 to maintain a substantially horizontal position when the cup is tilted forwardly, which is the direction to the left of the handle and at right angles thereto as viewed in Fig. 1. The use of the pintles 12 for eccentrically positioning the yolk retainer 13 with respect to the cup 8 is therefore extremely important. It eliminates the necessity for the provision of a special stop or abutment which while producing the same result would be objectionable when the cup 8 is used for other purposes.

Figure 4:
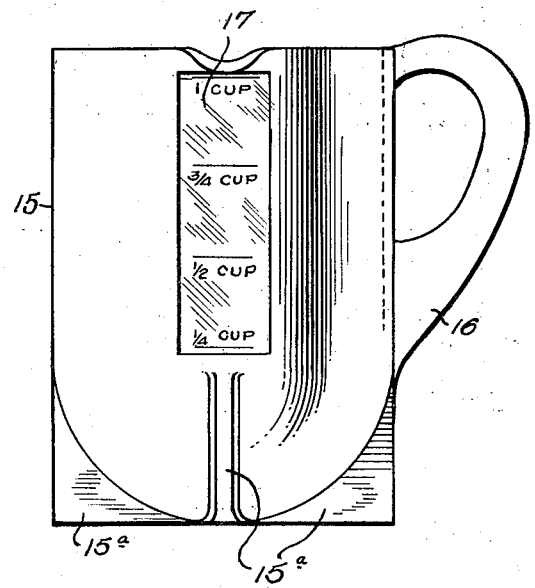
Fig. 4 is a side elevational view of a modified form of the invention, wherein the parts are made of plastic instead of metal.
Figure 6:
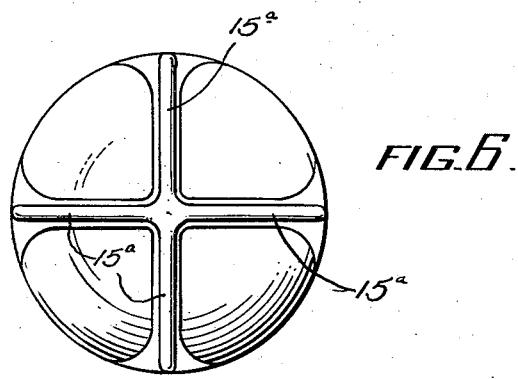
Fig. 6 is a bottom plan view of the device shown in Figs. 4 and 5.

The modification shown in Figs. 4, 5 and 6 differs from the previously described version of the invention mainly in that the cup, which is designated as at 15, is made of plastic and has the four right angularly disposed panels or vanes 15a radiating from the rounded bottom 15b. These vanes 15a, in association with the rounded bottom 15b, give the cup a distinctive and ornamental appearance aside from providing a supporting base for the same. The handle 16 is provided as shown; and the egg receiving yolk retainer corresponds to that illustrated in Figs. 1, 2 and 3, both as to construction and mounting. It may be made of plastic or material other than metal, and the same applies to the supporting pintles.

In both forms of invention, the walls of the cup 8 (or 15) will be somewhat springy so that when pressure is brought to bear against the exterior walls adjacent the mouth, at right angles to the pintles 12, the pintle receiving recesses 11 will be moved outwardly sufficiently to free the pintles, causing the yolk retainer to drop into the bottom of its cup. Thus, cleaning of the parts is facilitated, and the cup made available for general use—as a measuring cup for instance.

So as to visually indicate the height of the contents of the cup 8 or 15, I preferably provide same with a vertical opening in its wall in which is fitted a transparent panel 17. This panel will preferably be located alongside the exterior graduations 9.

Figure 8:
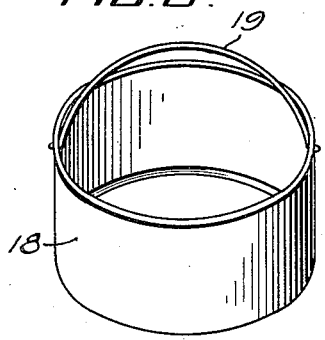
Fig. 8 is a perspective view of the cutting knife removed.
Figure 7:
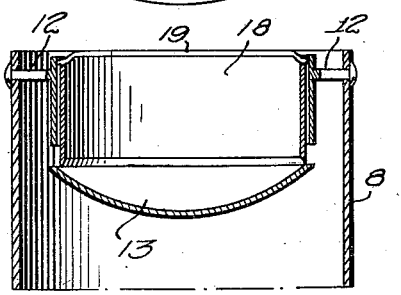
Fig. 7 is a fragmentary perspective view of my egg separator illustrating a circular knife for separating the albumen from the yolk.

As shown in Figs. 7 and 8, I may employ the circular knife 18 for cutting the albumen from the yolk. This knife is adapted to contiguously engage the inner periphery of the yolk retainer 13 as illustrated in Fig. 7, and it has a depth which is such as to dispose its lower cutting edge 18a approximately at the outer peripheral portion concave bottom 13a of the yolk retainer. The circular knife has a bail-like handle 19 pivoted thereto adjacent its upper edge for convenient handling. The bail is adapted to overlie the rim of the circular knife 18 as illustrated.

It is also to be noted that the circular knife 18 can be made use of as a biscuit or cookie cutter.

Having thus described my invention, what I claim is:

1. An egg separator comprising a walled egg-receiving yolk retainer having a dished bottom and albumen outlet openings above said bottom, a support for said yolk retainer, said support having a hole in its top and said yolk retainer being diametrically smaller than said hole and being eccentrically positioned in said hole and horizontally pivoted at opposite sides to said support for vertical swinging movement in said hole, and abutment means engaging said yolk retainer to cause it to move with the support when the latter is tilted in one direction while permitting it to maintain a normal yolk retaining position when the support is tilted in the opposite direction, said outlet openings being at the side of the yolk retainer opposite the extremities of the eccentrically disposed support which acts as abutting means on the side in contact with the outer side of the yolk retainer.

2. The combination set forth in claim 1, and said support comprising an albumen-receiving vessel.

3. An egg separator comprising a walled egg-receiving yolk retainer having albumen outlet openings, a support for said yolk retainer and comprising a vessel receiving albumen through said outlet openings, and means pivoting the yolk retainer to the support for relative swinging movement, said albumen outlet openings being disposed below and in a plane horizontal with the axis of said pivoting means, said vessel or cup being diametrically larger than said walled egg-receiving yolk retainer, and the latter being disposed in said vessel or cup eccentrically with respect to the vertical axis of the same, said outlet openings being at the side of the yolk retainer opposite the extremities of the eccentrically disposed support which acts as abutting means on the side in contact with the outer side of the yolk retainer, said walled egg-receiving yolk retainer being removable from the vessel or cup whereby the latter can be used for divers purposes, the interior walls of the vessel or cup being substantially unobstructed when the walled egg-receiving yolk retainer has been removed.

4. An egg separator comprising an egg-receiving yolk retainer having a dished bottom and albumen outlets above the same, a supporting cup for said yolk retainer and receiving albumen through said openings, and means pivoting the yolk retainer to the support for relative swinging movement in one direction and normally disposing one portion of the wall of the retainer in contact with the inner side of the cup, said vessel or cup being diametrically larger than said walled egg-receiving yolk retainer, and the latter being disposed in said vessel or cup eccentrically with respect to the vertical axis of the same, said outlet openings being at the side of the yolk retainer opposite the extremities of the eccentrically disposed support which acts as abutting means on the side in contact with the outer side of the yolk retainer, said walled egg-receiving yolk retainer being removable from the vessel or cup whereby the latter can be used for divers purposes, the interior walls of the vessel or cup being substantially unobstructed when the walled egg-receiving yolk retainer has been removed.

5. An egg separator comprising an egg-receiving yolk retainer having a dished bottom and albumen outlets above the same, a supporting cup for said yolk retainer and receiving albumen through said openings, and means pivoting the yolk retainer to the support for relative swinging movement in one direction and normally disposing one portion of the wall of the retainer in contact with the inner side of the cup, said pivoting means comprising opposed sets of interengaging parts in the form of recesses and pintles at opposing outer and inner sides of the retainer and support, respectively, one part of each set being carried by the support and the other by the yolk retainer, and one of said parts being carried by stiff flexible material whereby the part of each set may be disengaged from the other part of said set by inward finger-inserted pressure at opposite sides at right angles to the axis of said pivoting means, said vessel or cup being diametrically larger than said walled egg-receiving yolk retainer, and the latter being disposed in said vessel or cup eccentrically with respect to the vertical axis of same, said outlet openings being at the side of the yolk retainer opposite the extremities of the eccentrically disposed support which acts as abutting means on the side in contact with the outer side of the yolk retainer, said walled egg-receiving yolk retainer being removable from the vessel or cup whereby the latter can be used for divers purposes, the interior walls of the vessel or cup being substantially unobstructed when the walled egg-receiving yolk retainer has been removed.

LESLIE A. MINTON.

REFERENCES CITED

The following references are of record in the file of this patent:

UNITED STATES PATENTS

| Number | Name | Date |
|---|---|---|
| 1,101,041 | Schenk | June 23, 1914 |
| 1,214,720 | Sobeck | Feb. 6, 1917 |
| 1,216,245 | Norman | Feb. 13, 1917 |
| 1,476,249 | Hall | Dec. 4, 1923 |
| 1,479,730 | Moeslein | Jan. 1, 1924 |
| 1,533,377 | Bruffee | Apr. 14, 1925 |
| 1,759,512 | Kramer et al. | May 20, 1930 |